Jan. 4, 1966 W. H. PETERSON 3,226,848

BINARY COUNTER DEVICE

Filed Sept. 28, 1962 2 Sheets-Sheet 1

Inventor:
Wayne H. Peterson,
By Cromwell, Greist + Warden
Attys.

Inventor:
Wayne H. Peterson,
By Cromwell, Greist & Warden
Attys.

3,226,848

BINARY COUNTER DEVICE

Wayne H. Peterson, Bothell, Wash., assignor to The Welch Scientific Company, Chicago, Ill., a corporation of Illinois Filed Sept. 28, 1962, Ser. No. 226,876
7 Claims. (Cl. 35—32)

The present invention is directed to a binary counter device particularly adapted for use as an instructional aid for the purpose of teaching the basic concepts of the binary number system. More specifically, the invention is directed to a mechanical device useful in the illustration of the mathematical concept of the binary number system.

The basic concept of the binary number system is well known and widely used, particularly in the computer field. Briefly, the basic symbols 0 and 1, constituting the only numbers or symbols used in the binary system, represent in an electronic digital computer the "off" and "on" positions respectively of the individual computer component circuits. In a digital computer, a large number of diode circuits are controlled by use of the binary number system to perform extensive mathematical computations, the information fed to the computer being based on the binary system to materially simplify the complexities of the form and substance of such information without losing in any respect the full significance and value thereof.

Additionally, the binary number system finds substantial utility in automatic machine control which utilizes a punched flexible tape to control multiple and complex machine operations. A binary code is punched in the flexible control tape, fed through a reader, and the reader operates a complexity of switches which in turn automatically control the operation of a specific machine in accordance with a prearranged cycle to perform a series of machine operations for purposes such as metal shaping and the like. The advantages of a binary number code for planned automatic machine operation are well known. By use of the binary number system, the control tape may be supplied with a substantial amount of condensed information which in turn is readily translated to its full extent and effect by the reader portion of the machine without any loss of information required by the machine to carry out in full its intended operations.

It is an object of the present invention to provide a new and improved device particularly adapted for instructional use to illustrate the basic concept of the binary number system and all of the advantages attendant to its use.

A further object is to provide an uncomplicated instructional binary counter device of new and improved design which very effectively illustrates and utilizes the advantages of the binary number system in the condensing of mathematical information.

Still a further object is to provide an educational device particularly adapted for use in teaching the basic concepts and advantages of the binary number system.

Other objects not specifically set forth will become apparent from the following detailed description of the invention made in conjunction with the accompanying drawings wherein.

Figure 1:
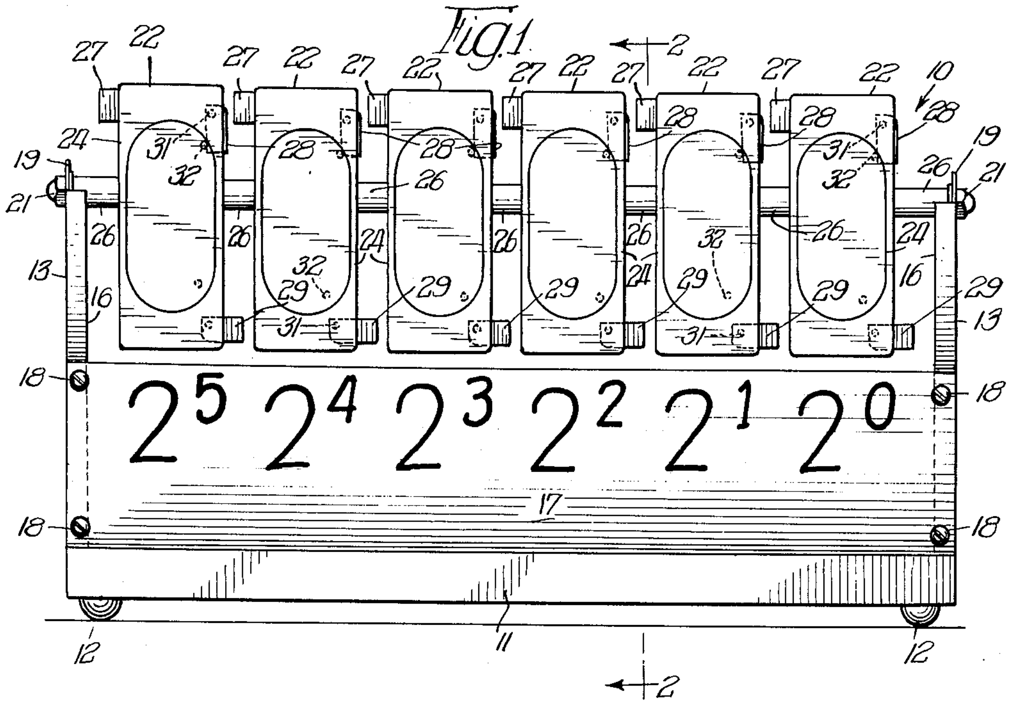
FIG. 1 illustrates the binary counter device of the invention in elevation.
Figure 2:
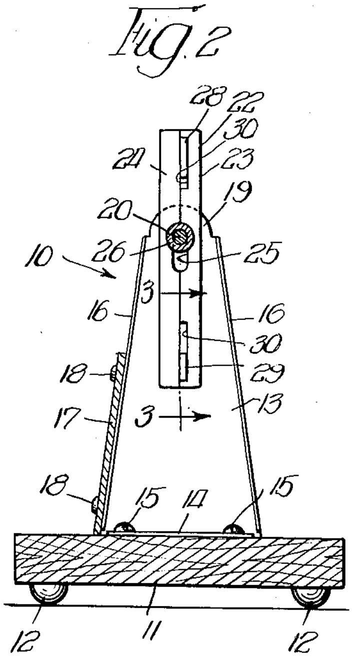
FIG. 2 is a vertical section of the device taken generally along line 2—2 in FIG. 1.

The device 10 of the invention in the specific form illustrated makes use of a plurality of pivotally mounted members arranged in association for mutual interlocking throughout certain prescribed portions of their pivotal cycle of operation, the members being provided with fixed flange-like means located to establish predetermined mutual interengagement between adjacent members during the course of relative operation thereof, and additionally including gravity responsive flange-like means also arranged for predetermined interengagement between relative members during predetermined cycles of operation thereof. FIGS. 1 and 2 best illustrate the general arrangement of the various means of the device 10. This device includes a horizontal base member 11 provided with suitable bottom surface supports 12 and at opposite ends thereof having mounted on the top surface upwardly projecting end plates 13. Each end plate 13 includes a bottom inwardly directed flange portion 14 through which suitable fasteners 15 are received in engagement with the base member 11. Each end plate 13 further includes inwardly directed opposite side flanges 16 which serve to impart rigidity to the end plate and which also provide means by which an information board or plate 17 is mounted along the front surface of the device by fasteners 18 extending therethrough into engagement with the adjacent flanges 16. The top portion of each end plate 13 is formed with an apertured ear portion 19 which journals therethrough a rod or shaft 20 secured at opposite ends to the end plates 13 by cap nuts 21.

The rod 20 has mounted thereon between the end plates 13 a plurality of pivotal blocks 22 each of which as illustrated is formed from combined halves 23 and 24 which are generally of rectangular cup or pan-like shape and which may be formed from suitable molded plastic material with the halves 23 and 24 being fixed together against separation about the rod 20. The blocks 22 are thus generally hollow and the opposite side edges centrally thereof are formed with transversely aligned elongated slots 25 through which the rod 20 is received. Each block 22 is somewhat loosely pivotally mounted on the rod 20 and is readily pivoted thereabout into and out of two positions of rest between which an arc of 180° is described. As illustrated in FIG. 2, the rod 20 is located in engagement with an upper end of the slots 25 sufficiently above the transverse center of the block 22 to place the same in a stabilized position of rest. Upon rotation of the block 22 through an arc of 180°, the block will slide on the rod 20 to provide engagement between the rod and the other end of the slots 25 thus completely reversing the position of the block 22 in its second stabilized position of rest with the opposite face of the block 22 exposed above the information board 17. Suitable collar-like spacer elements 26 are received on the rod 20 between the blocks 22 to maintain the same in proper longitudinally spaced relation. The spacer elements 26 are of greater outer diameter than the width of slots 25 to confine the blocks 22 in proper spaced relation.

Figure 3:
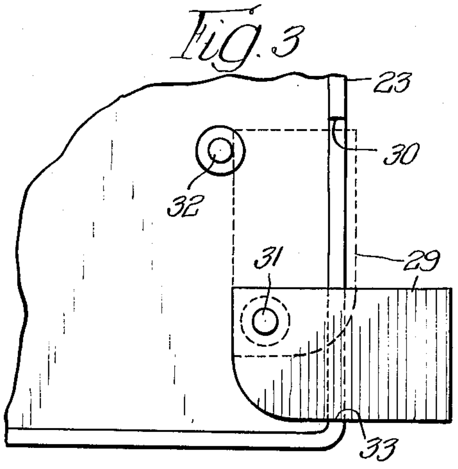
FIG. 3 is an enlarged fragmentary section of a corner portion of one of the pivotal block members forming a part of the device and illustrating the mounting of a pivotal flange means therein, this section being taken generally along line 3—3 in FIG. 2.

As described above, each block 22 is formed with a hollow interior. One half section 23 is formed along its juncture with the other half section 24 with a single fixed flange 27 which projects outwardly from the block 22 at a corner thereof. At the directly transversely opposite corner as well as the diagonally opposite corner the block half 23 is formed with pivotal flanges 28 and 29 received through slots 30 adjoining the juncture of the block half with the remaining half 24 and providing access into the hollow interior of the block 22. As best shown in FIG. 3, the pivotal flanges 28 and 29 are designed for gravity operation and are of generally rectangular shape while being pivotally mounted on pin means 31 inside the block 22. The pivotal mounting of each of the flanges 28 and 29 occurs at one corner thereof to permit outward pivoting as illustrated in FIG. 3 through the slots 30 in response to gravity action when the particular corner of the block 22 carrying one of the flanges 28 and 29 is moved into the lowermost position of the block. In the raised position of the corner of the block 22 as shown in FIGS. 1 and 2, gravity action further provides for a recessing of each flange 28 and 29 by pivoting about a pin 31 into a slot 30 in recessed relation within the block 22. The extent to which each flange 28 and 29 pivots is controlled by edge abutment thereof with a fixed pin-like means 32 located within the block 22 spaced inwardly from each slot 30 and an edge surface 33 constituting the outer end of each slot 30. FIG. 3 illustrates in solid lines the outwardly projecting operative position of the flange 29 which is limited by bottom edge abutment thereof with the slot end surface 33 and illustrates the inoperative recessed or stored position of the flange 29 in broken lines with an opposite edge surface in engagement with the fixed pin 32. The pivotal flange 28 operates in a similar manner.

Each of the blocks 22 carries on one face thereof the number 0 and on the opposite face thereof the number 1. The information board 17 may carry any suitable information for the purpose of illustrating the advantageous use of the binary number system in the condensing of mathematical information. For example, the information board 17 as illustrated includes a progression of the base number 2 raised to consecutive powers from 0 through 5. Each power is located directly below a block 22. The device is illustrated in FIG. 1 as being set for binary number determination with all of the blocks being arranged with their faces carrying the number 0 exposed for direct observance.

Figure 4:
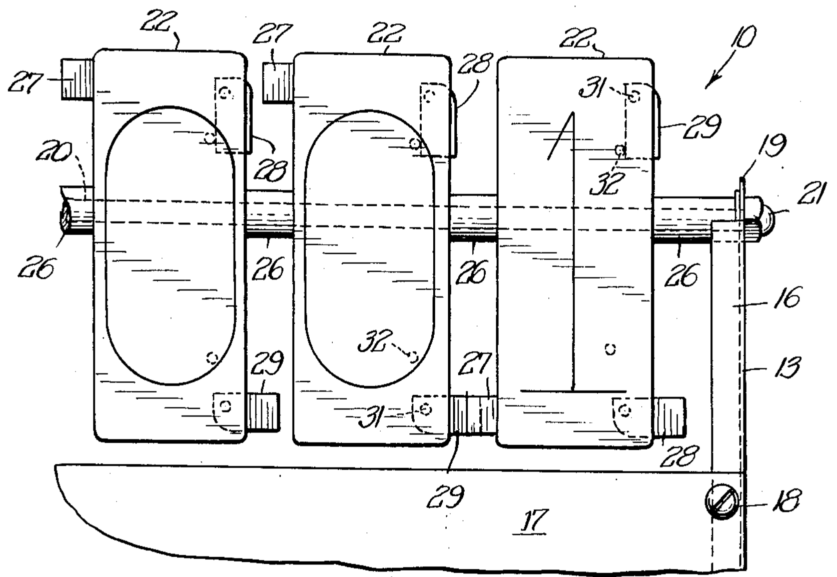
FIG. 4 is a fragmentary elevation of a portion of the device illustrating operation thereof.

In the positions of all of the blocks 22 of FIG. 1, the fixed flanges 27 are located out of engagement with any flanges of adjacent blocks. The pivotal flanges 28 are located in their uppermost positions and are recessed in their respective slots 30. The pivotal flanges 29 are located in their lowermost positions and project radially from the blocks 22 but are free from engagement with any flanges of adjacent blocks. By flipping the first block 22 as viewed at the right in FIGS. 1 and 4, the block will be reversed with the rear face number 1 exposed as shown in FIG. 4. The flipping is accomplished by finger engagement of the top surface of the block 22 in its position shown in FIG. 1 and sufficient pulling of the top portion of the block toward the viewer until the block is overbalanced and slides on the rod 20, as controlled by the slots 25, and ultimately pivots by its own weight through a complete arc of 180° into its inverted second position of rest. During such pivoting the pivotal flange 28 independently pivots into its operative projecting position and the flange 29 independently pivots from its operative projecting position as shown in FIG. 1 into its recessed position as shown in FIG. 4, the positions of these flanges now being reversed. The fixed flange 27 is now placed in engagement with the outwardly projecting flange 29 of the adjacent block 22 as shown in FIG. 4.

Further pivoting of the first block 22 from the position illustrated in FIG. 4 wherein the number 1 thereof is exposed results in coupled pivoting of the immediately next adjacent block 22 through a similar arc of 180° by reason of the interengagement or coupling established between these blocks by contact of the fixed flange 27 of the first block with the pivotal flange 29 of the second block. In bringing about the pivoting of the coupled first and second blocks 22 from the position shown in FIG. 4 to the position shown in FIG. 5, it is necessary merely to grasp the first block 22 at the top thereof in the manner previously described and pivot the same sufficiently toward the viewer to result in complete flipping thereof, the second block 22 traveling fully with first block 22 by reason of the coupling betwen the interengaged bottom flanges.

Figure 5:
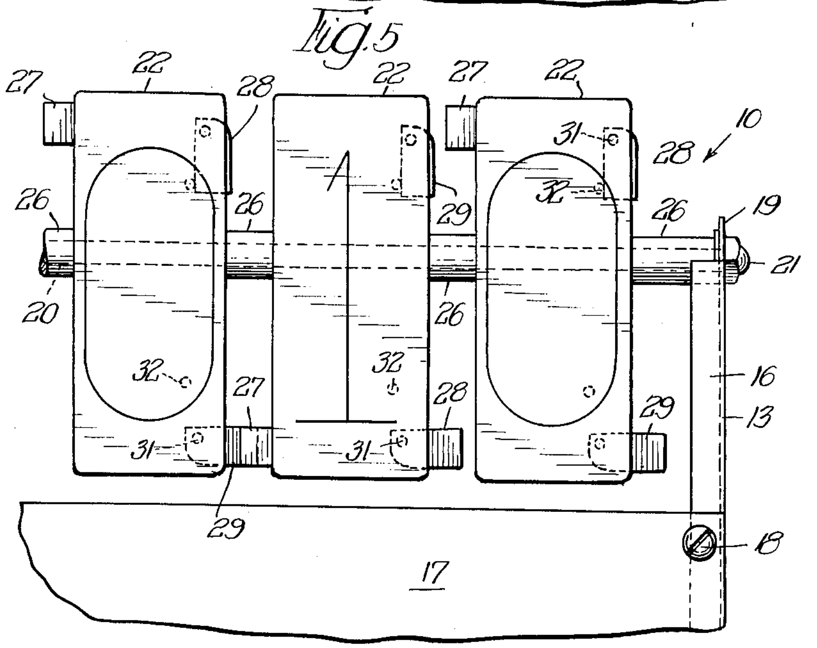
FIG. 5 is a view similar to FIG. 4 illustrating additional operational aspects of the device.

With the blocks in the positions shown in FIG. 5, the first block has been returned to its original position exposing the numeral 0, the second block has been rotated 180° to expose its numeral 1, and the second block is now in coupled relation with the third block which has not as yet been pivoted. It will be noted that with the pivoting of the first block 22 through its second arc of 180°, the fixed flange 27 thereof returns to its top position, the pivotal flange 29 of the second block has been moved to its top position and in response to gravity has pivoted into its recessed inoperative position, and the pivotal flange 28 of the second block has been moved to its bottom operative position. This arrangement temporarily eliminates the coupled relation of the first and second blocks and the first block is again free to pivot through another arc of 180° independently of the second block. Thus it will be appreciated that in the positions of the blocks shown in FIG. 5, the first block 22 is free to again pivot through an arc of 180° to expose the numeral 1 thereof to the viewer resulting in engagement between the fixed flange 27 thereof with the pivotal flange 28 of the second block. The device then shows the numerals 1 on the first and second blocks.

Further pivoting of the first block through the next 180° arc results in simultaneous coupled pivoting of the first three blocks returning the second block to the numeral 0 and pivoting the third block for the first time to expose the numeral 1 thereof. This particular sequence of block operation will continue with subsequent pivoting of the first block 22 from one position of rest to another and will result ultimately in various interengagements between the remaining blocks forming a part of the device. Ultimately all of the blocks will be positioned to expose their numerals 1 and will be coupled so that they will all pivot at one time upon the next rotation of the first block 22 to return to their initial positions shown in FIG. 1 wherein their numerals 0 are exposed to the viewer.

In following the procedure set forth above, the number sequence exposed to the viewer will follow the progression of 1, 10, 11, 100, 101, 110, 111, 1000, etc. As correlated with the number 2 appearing on the information board 17 and associated with its increasing powers from 0 to 5, the location of the numbers 1 of the various blocks 22 directly over any one of the base numbers 2 appearing on the instruction panel will designate the value of the base number 2 raised to that specific power. In other words, FIG. 5 illustrates the binary number system value of 10, or the number 1 in the second position, which represents and is equal to the number 2 raised to the first power. The number of turns of the first block 22 necessary to reach the value of the number 2 to the first power is equal to two turns thus providing a positive count means by which the complete value of the number 2 to the first power is known. In this respect the number 2 taken to the fourth power is equal to 16 and it will be necessary to flip the first block 22 sixteen times before the numeral 1 of the block directly over the number 2 to the fourth power appearing on the information board 17 is observed by the viewer.

Thus the device constitutes a dynamic means by which the advantages of the binary number system as well as the use thereof can be clearly and quite readily explained. In this respect the basic "off" and "on" characteristics of the numerals 0 and 1 respectively are readily understood with regard to the use of the binary system in the control and operation of multiple circuits for computation purposes. The specific form of the instructional device 10 provides a dramatic illustration of the advantageous use of the binary number system in program controlling by use of punched flexible tape fed into a reader forming a part of an automatic machine system. The limited series of six aligned blocks 22 of the device can represent the width of a flexible tape and the number of transversely aligned locations for perforations. With this concept in mind it can be readily explained by the instructor that a very wide range of information can be selectively incorporated in a single transverse area of tape.

Obviously certain modifications and variations of the invention as hereinbefore set forth may be made without departing from the spirit and scope thereof, and therefore, only such limitations should be imposed as are indicated in the appended claims.

I claim:

1. A binary counter device comprising a plurality of members mounted for pivotal movement in alternately coupled and uncoupled series relation, each of said members being formed with elongated slot means centrally thereof and engaged with shaft means about which said members pivot from one position of rest to another, a portion of each of said members being provided with fixed outwardly projecting flange means, spaced separate portions of each of said members carrying pivotally mounted flange means arranged to alternately be in an inoperative position when said member is in one position of rest and in an outwardly projecting operative position aligned for engagement with a fixed flange means of an adjacent member when said member is in said other position of rest.

2. A binary counter device comprising a plurality of block-like members mounted for pivotal movement in alternately coupled and uncoupled series relation, each of said members being formed with elongated slot means centrally thereof and engaged with shaft means about which said members pivot through an arc of 180° from one position of rest to another, one corner portion of each of said members being provided with a fixed outwardly projecting flange means, other corner portions of each of said members directly and diagonally opposite said fixed flange means carrying pivotally mounted flange means arranged to alternately be in an inoperative position when said member is in one position of rest and in an outwardly projecting operative position aligned for engagement with a fixed flange means of an adjacent member when said member is in said other position of rest.

3. A binary counter device comprising a plurality of members mounted for pivotal movement in alternately coupled and uncoupled series relation, each of said members being formed with elongated slot means centrally thereof and engaged with shaft means about which said members pivot from one position of rest to another, spacer elements on said shaft means between said members, a portion of each of said members being provided with fixed outwardly projecting flange means, spaced separate portions of each of said members carrying pivotally mounted flange means arranged to alternately be in an inoperative position when said member is in one position of rest and in an outwardly projecting operative position aligned for engagement with a fixed flange means of an adjacent member when said member is in said other position of rest, said spacer elements locating said members relative to one another for interengagement between fixed and pivotal flange means when a pivotal flange means is in operative position and for clearance therebetween when a pivotal flange means is in inoperative position.

4. A binary counter device comprising a plurality of block-like members mounted for pivotal movement in alternately coupled and uncoupled series relation, each of said members being formed with elongated slot means centrally thereof and engaged with shaft means about which said members pivot through an arc of 180° from one position of rest to another, spacer elements on said shaft means between said members, one corner portion of each of said members being provided with a fixed outwardly projecting flange means, other corner portions of each of said members directly and diagonally opposite said fixed flange means carrying pivotally mounted flange means arranged to alternately be in an inoperative recessed position when said member is in one position of rest and in an outwardly projecting operative position aligned for engagement with a fixed flange means of an adjacent member when said member is in said other position of rest, said spacer elements locating said members relative to one another for interengagement between fixed and pivotal flange means when a pivotal flange means is in operative position and for clearance therebetween when a pivotal flange means is in inoperative position.

5. A device comprising a series of members, means mounting said members relative to one another for pivoting of each member between two positions of rest which are 180° apart, each of said members being provided with adjacent member coupling means located to engage a portion of an adjacent member during pivoting of a member through alternate 180° cycles from one position of rest to another, whereby said members are each successively coupled with adjacent members for simultaneous pivoting through selected cycles beginning at one end of said series and operating progressively to the other end thereof.

6. A device comprising a plurality of block-like members, means mounting said block-like members relative to one another for pivoting of each block-like member between two positions of rest which are 180° apart, each of said block-like members being provided with gravity activated means located to engage a portion of an adjacent block-like member during pivoting of a block-like member through alternate 180° cycles from one position of rest to another.

7. A device comprising a plurality of block-like members, means mounting said block-like members relative to one another for pivoting of each block-like member between two positions of rest which are 180° apart, each of said block-like members being provided with gravity activated means located to engage a portion of an adjacent block-like member during pivoting of a block-like member through alternate 180° cycles from one position of rest to another, and means mounting said gravity activated means on each of said block-like members for movement on said block-like members into and out of adjacent block-like member engaging positions during pivoting of a block-like member through said cycles.

References Cited by the Examiner

UNITED STATES PATENTS

| | | | |
|---|---|---|---|
| 603,419 | 5/1898 | Baginski | 58—124 |
| 3,006,082 | 10/1961 | Libbey | 35—30 |
| 3,116,014 | 12/1963 | Aymer | 35—30 X |

EUGENE R. CAPOZIO, *Primary Examiner.*

JEROME SCHNALL, *Examiner.*